United States Patent [19]

Dunkley et al.

[11] Patent Number: 4,930,078
[45] Date of Patent: May 29, 1990

[54] SEMI-AUTOMATIC MECHANICAL TRANSMISSION CONTROL AND CONTROL METHOD

[75] Inventors: Michael W. Dunkley, Longridge; John E. Stainton, Chorley, both of England

[73] Assignee: Eaton Corporation, Cleveland, Ohio

[21] Appl. No.: 121,381

[22] Filed: Nov. 16, 1987

Related U.S. Application Data

[60] Continuation-in-part of Ser. No. 899,564, Aug. 22, 1986, which is a division of Ser. No. 755,628, Jul. 16, 1985, Pat. No. 4,648,290.

[30] Foreign Application Priority Data

Dec. 5, 1986 [EP] European Pat. Off. ........ 86309479.3

[51] Int. Cl.$^5$ ...................... B60K 41/08; B60K 41/28
[52] U.S. Cl. .................................. 364/424.1; 74/866; 74/877
[58] Field of Search ............... 364/424.1; 74/866, 877, 74/859, 865, 866; 192/3.62

[56] References Cited

U.S. PATENT DOCUMENTS

| | | | |
|---|---|---|---|
| 3,927,528 | 12/1975 | Van Der Kolk et al. | 74/865 |
| 4,046,032 | 9/1977 | Braun et al. | 74/865 |
| 4,338,832 | 7/1982 | Pelligrino | 364/424.1 |
| 4,425,620 | 1/1984 | Batcheller et al. | 364/424.1 |
| 4,631,679 | 12/1986 | Klatt | 74/859 |
| 4,638,690 | 1/1987 | Hattori et al. | 74/866 |
| 4,643,048 | 2/1987 | Hattori et al. | 74/866 |
| 4,645,045 | 2/1987 | Takefuta | 364/424.1 |
| 4,648,290 | 3/1987 | Dunkley et al. | 74/866 |

*Primary Examiner*—Felix D. Gruber
*Attorney, Agent, or Firm*—H. D. Gordon

[57] ABSTRACT

A control and control method for a semi-automatic mechanical transmission system (10) is provided for sensing operator request for a direct downshift into an optimum pull-away ratio and for automatically determining and engaging the optimum pull-away ratio.

18 Claims, 9 Drawing Sheets

SEMI-AUTOMATIC MECHANICAL TRANSMISSION CONTROL AND CONTROL METHOD

RELATED APPLICATIONS

This application is a continuation-on-part of copending U.S. Ser. No. 899,564, filed Aug. 22, 1986, which is a division of U.S. Ser. No. 755,628, filed July 16, 1985, now U.S. Pat. No. 4,648,290, which claims priority from British Provisional Patent Application No. 8418749 filed July 23, 1984.

BACKGROUND OF THE INVENTION

1. Field Of the Invention

The present invention relates to a control system and method for a semi-automatic mechanical transmission system, including a manually operated shift selector, for automatically controlling the changing or shifting of transmission gear ratios on a vehicle, while leaving the vehicle driver or operator some residual measure of control. In particular, the present invention relates to a control system and method for the semi-automatic control of a mechanical change gear transmission including means for automatically executing automatically determined and displayed allowable driver selected transmission ratio shifts, including automatic control of the vehicle master clutch in all but start from stop situations. More particularly, the present invention relates to a method of controlling a semi-automatic mechanical transmission wherein a single downshift request made at a time when engine speed is below a predetermined reference engine speed is interpreted as a request for a downshift into the transmission ratio providing an engine speed approximately equal to the midpoint between maximum governed engine speed and peak torque engine speed.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear transmissions include transmissions wherein pressurized fluid is utilized to frictionally engage one or more members to other members or to a ground to achieve a selected gear ratio and automated mechanical transmissions utilizing electronic and/or pneumatic logic and actuators to engage and disengage mechanical (i.e. positive) clutches to achieve a desired gear ratio. Examples of such transmissions may be seen be reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof. Moreover, many vehicle operators like to control the selection of the gear ratios, particularly since they can see and/or know the nature of the road ahead and/or of the load being carried. Heavy-duty vehicles must often by accurately maneuvered into restricted spaces at slow speeds, wherein fully automatic transmissions tend to only engage a given low gear. Particularly at such times, when fuel metering to the engine is imperfect, as often happens temporarily in any vehicle system, the vehicle operator tends to have difficulty in performing delicate maneuvers with a fully automatic transmission, especially those not equipped with a manual clutch control pedal, unless the operator is also utilizing the vehicle brake with his left foot.

The above drawbacks have been minimized by providing a semi-automatic mechanical transmission control wherein automatic changing between a plurality of gear ratios is provided while normally permitting the driver to choose when to make a particular gear ratio change, whether to select the immediately consecutive ratio up or down or to skip one or more ratios, and when to slip, i.e. to incompletely engage, the vehicle master clutch in a low or crawler gear. Furthermore, the semi-automatic control system prohibits engagement of a driver selected higher ratio, i.e. an upshift, that would cause the engine speed to decrease below the idle speed, i.e. would cause stalling and/or overstressing at low speeds of the engine, and of a lower ratio, i.e. a downshift, if such a change would cause overspeeding of the engine. It is noted that with manual mechanical transmissions such overspeeding of the engine can occur due to a improper downshift even though the engine speed may be governed against accelerating above the governed engine RPM. Examples of such a semi-automatic transmission control can be seen by reference to allowed U.S. patent application Ser. No. 755,628 filed July 16, 1985, now U.S. Pat. No. 4,648,290.

While the above-described semi-automatic mechanical transmission control does provide a very desirable semi-automatic control, the control was subject to improvement as, if the driver or operator desired a smooth shift into a strong pull-away gear after slowing of the vehicle sufficiently to cause engine speed in the current ratio to fall below an acceptable torque level, the driver was required to identify the desired ratio, to calculate the number of downshifts from the currently engaged ratio to the desired ratio and to then move the selector lever that number of times in the downshift direction.

SUMMARY OF THE INVENTION

In accordance with the present invention, the drawbacks of the prior art semi-automatic mechanical transmission control have been minimized or eliminated by the provision of a control and control method which, if the vehicle is in motion and engine speed in the currently engaged gear ratio has fallen to below an acceptable reference value, will interpret, and if allowable will execute, a single movement of the control lever in the downshift direction as a request for a downshift directly into the gear ratio which, at current vehicle speed, will result in an engine speed midway between maximum (governed) engine speed and peak torque engine speed. In a typical diesel engine, the reference value will be about 800 to 1200 RPM, while the desired or target engine speed after the downshift will be about 1700 to 1800 RPM to provide a smooth yet powerful pull-away for a vehicle slowed by traffic and/or terrain.

Accordingly, it is an object of the present invention to provide a new and improved control method for semi-automatic mechanical transmission having a control for automatically determining allowable up and down shifts from a given gear ratio, preferably for automatically displaying same, and for automatically executing such permissible gear ratio changes upon selector lever manual selection thereof by the vehicle operator, wherein the operator can request an automatic selection of and shift into the optimal pull-away gear by a single movement of the selector lever.

Preferably, the semi-automatic mechanical transmission system additionally includes a manually operated vehicle master clutch operable by the vehicle operator during start from stop conditions, thereby simplifying the control of the automatic mechanical transmission system and allowing the operator to slip the clutch during crawler maneuvering situations.

This and other objects and advantages of the present invention will become apparent from a reading of the following description of the preferred embodiments taken in connection with the attached drawings.

BRIEF DESCRIPTION OF THE DRAWINGS

FIG. 3B is an enlarged view of a portion of the display illustrated in FIG. 3.

DESCRIPTION OF THE PREFERRED EMBODIMENT

Figure 1:
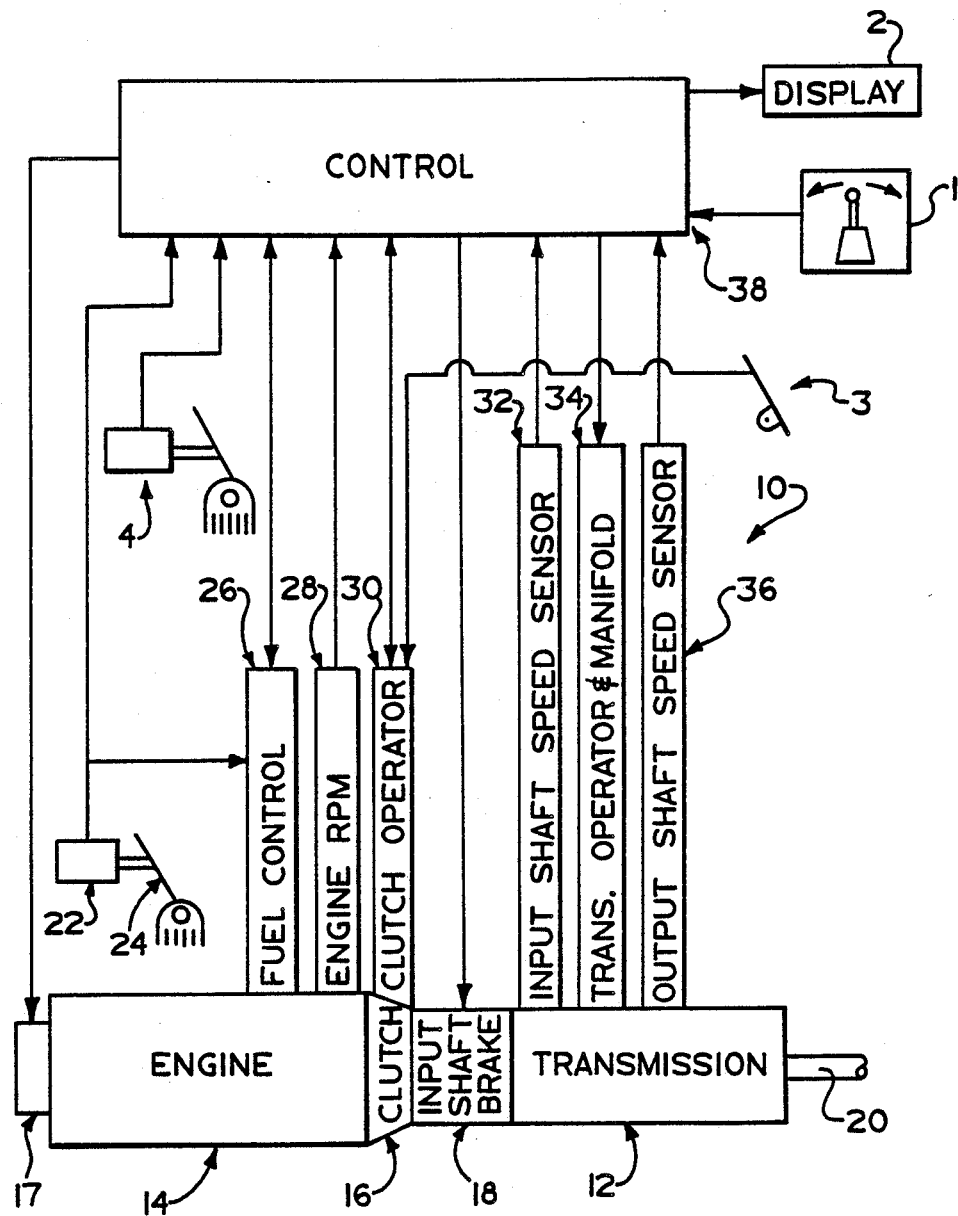
FIG. 1 is a schematic illustration of the semi-automatic mechanical change gear transmission system of the present invention.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "simple transmission" is used to designate a change speed transmission, wherein the operator may select one of a plurality of single gear reductions. The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio. The "displacement" between ratios refers to the number of selectable ratios between two given ratios, for example, third speed or gear ratio is displaced by one (1) and two (2) ratios, respectively, from fourth and fifth speed, respectively, in the downshift direction.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and-/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The present invention is applicable, in principle, to the semi-automatic control of any type of mechanical change gear transmission adaptable for providing output signals to and receiving command signals from electro-pneumatic control devices. However, the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in European Patent Application No. 82303586.2, published Feb. 9, 1983 (No. EP-A-0071353) and European Patent Application No. 83307061.8, published Sept. 5, 1984 (No. EP-A-0117342) disclosures of which publications are hereby incorporated by reference.

The semi-automatic transmission system to which the present invention is particularly advantageously related, is described an illustrated in European Patent application No. 85305072.2, published Feb. 5, 1986 (No.

EP-A-0 170 465), the disclosure of which publication is hereby incorporated by reference.

Referring to FIG. 1, the position of a driver-operated throttle 24 is sensed at sensor 22 and fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that engine speed is an indication of transmission input shaft speed, and visa versa, especially if clutch 16 is nonslippingly engaged, while transmission output shaft speed is an indication of vehicle speed.

Figure 2:
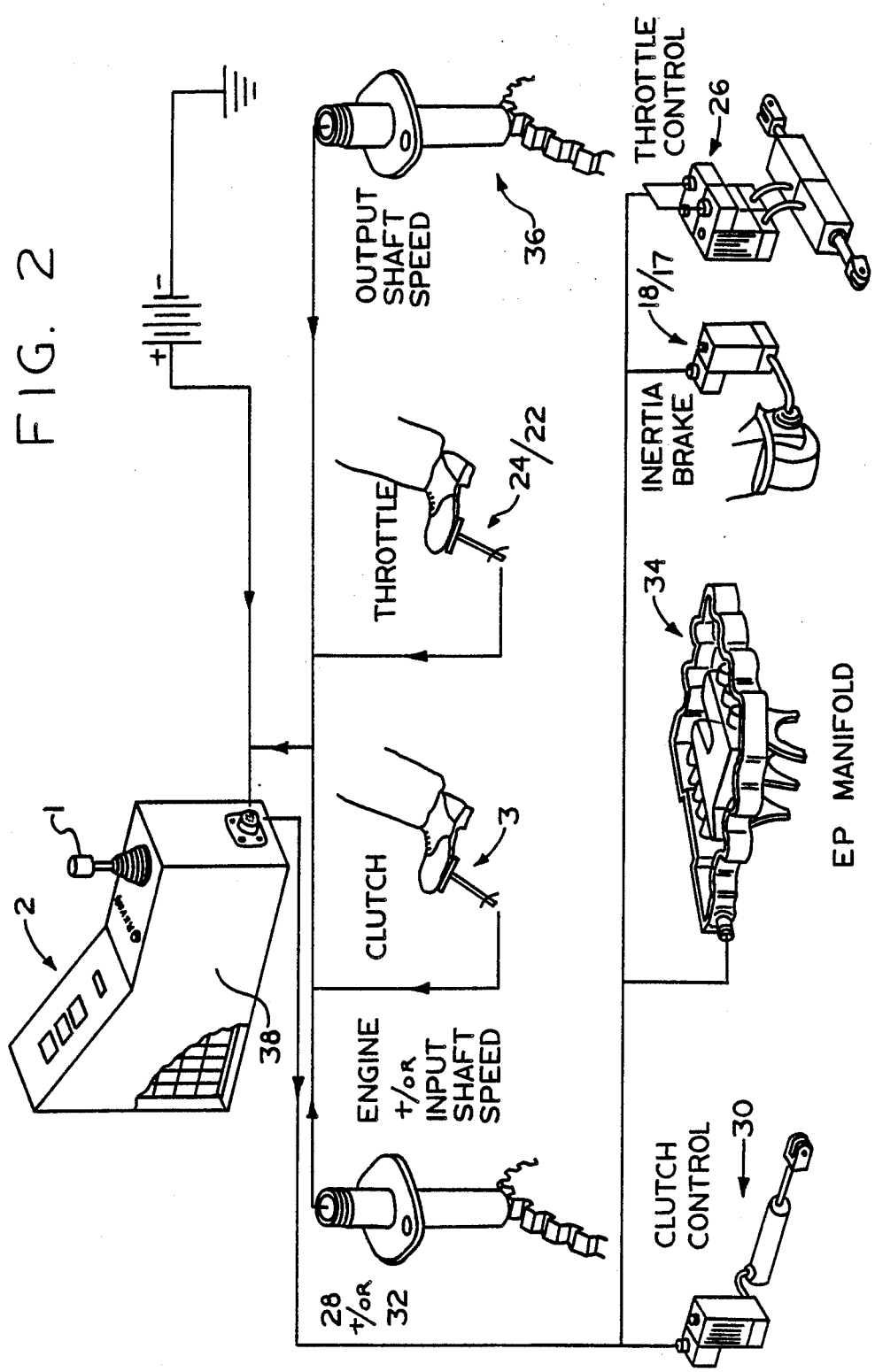
FIG. 2 is a schematic illustration of the control system of the semi-automatic transmission of the present invention.

Control logic circuits, sensors, and actuators for the transmission system 10 as disclosed in FIGS. 1 and 2, may be as disclosed in U.S. Pat. No. 4,361,060, the disclosure of which is hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The central processing unit also sends command output signals to the display 2 to be described in greater detail below. The semi-automatic transmission system 10 additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3:
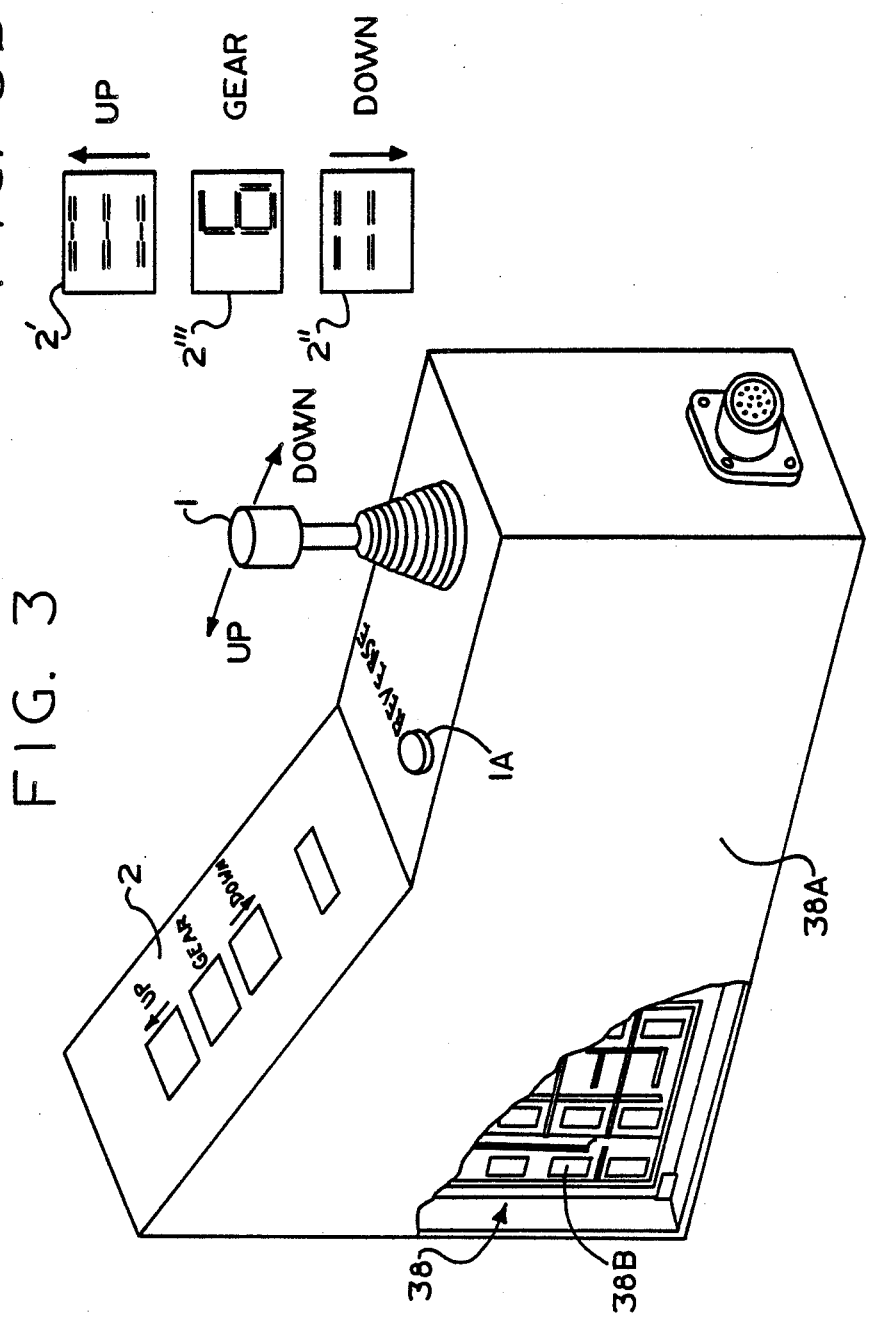
FIG. 3 is a perspective view of the driver's manual shift control and display device.

Preferably, as may be seen by reference to FIG. 3, the central processing unit 38 may be contained in a box or housing 38A, which housing carries the display panel 2 having an upshift indicator display 2', a downshift indicator display 2'', and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3B, the display 2 includes upshift indicator section 2', downshift indicator section 2'' and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2'' section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permitable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank, i.e. has no horizontal lines displayed therein, no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Upshifts and/or downshifts involving both the main and auxiliary section, i.e. compound shifts, are equally simple for the driver to achieve as are those involving only the auxiliary section, i.e. a split shift. In those transmissions provided with multiple reverse gear ratios, the transmission may be downshifted into lower reverse ratios and upshifted into higher reverse ratios by movement of the control lever backward and forward as indicated. Of course, any type of toggle switch or button which may be located on the end of the shift lever may be utilized in place of reverse enable button 1A.

It is understood that a single control lever moveable forward and backward in a given direction to select a forward and reverse mode of operation, and then moveable in a transverse direction to select upshifts and downshifts either single or multiple, of the type disclosed in U.S. Pat. No. 4,442,730, the disclosure of which is hereby incorporated by reference, may be substituted for the control lever 1 illustrated.

It is another important and advantageous feature of the semi-automatic control system of the present invention that, whenever the vehicle is brought to a complete stop, the clutch 16 is manually disengaged by means of foot pedal 3 and the lever 1 is moved in the downshift direction once, the control will automatically shift transmission 12 to a preselected, preferably the highest permissible, starting gear ratio, which may involve skip-shifting over a large plurality of intervening gear ratios. By way of example, in a twelve forward speed transmission, the highest permissible starting ratio may be third gear. Another lever movement in the downshift direction would the shift the transmission to second for a quicker or slightly uphill start, etc. The operator, at rest or in motion, can always select a gear ratio from those permitted. The manual clutch is only intended for use preparatory to stopping to disengage the transmission and avoid stalling and during starting from rest in any of the permissible starting gear ratios. If, during a semi-automatic shift, if the driver operates the manual clutch, the in-process gear change will be interrupted and will only continue upon re-engagement of the manual clutch.

As an optional feature, if in an emergency situation, such as during evasion of an obstacle in the road etc., the operator stops the vehicle without de-clutching the manual clutch, the very low road speed is sensed and the clutch 16 may be automatically disengaged. Such an automatic de-clutching procedure will prevent stalling of the engine, thus retaining steering and other engine driven powered functions. To again place the vehicle in motion, the operator will manually disengage clutch 16 and move the gear lever 1 in the downshift direction to again select the highest permissible starting ratio. Preferably, transmission 12 is a multi-speed transmission having at least five, preferably nine or more, selectable forward ratios.

The structure of a twelve forward speed splitter type transmission 12, and of the blocked jaw clutch members utilized in the auxiliary transmission section of transmission 12, is known in the prior art and may be appreciated in greater detail by reference to above mentioned U.S. Pat. Nos. 3,799,002; 3,921,469; 3,924,848; 4,194,410; 4,440,037; and to published European Patent Application Nos. EP-A-0071353 and EP-A-0117342.

The typical operation of the permissible ratio determination procedure and ratio change operating of the control system of the invention are now further explained.

The functions and components for the semi-automatic transmission are, gear ratio change selection switch or lever 1, display panel 2, control box 38, speed sensors 32, 36, engine (fuel) control 26, throttle and clutch sensors 22, 3 (detecting the driver's depression of them), electro-pneumatic control of shifts, clutch and brakes (using the engine manifold vacuum, together with a vacuum servo-follower if required), the input brakes 17 and/or 18 and their actuators, control cables, and the clutch actuator 30.

Referring to the items 1, 2 and central control unit 38, these input the driver's change requirements, tell him what gear he is in, which other ratios he can choose at any moment, including from rest, from sensed engine and vehicle status necessary to complete any gear shifts, either single or skip. Shifting is accomplished by the single or plural movement of the gear level 1, either forwards for up shifts or backwards for down shifts. The gear shift lever is spring biased to return to the rest or vertical position and one movement of the lever will instigate one shift control.

Control of the engine is by fuel control 26 which includes two (2) solenoid valves, one associated with the engine "dipping" and the other with engine "blipping". Dipping is used not only for up changes, but also preparatory to down changes to break the torque line. A back-to-back double pneumatic piston, which is slaved to the solenoid valves, provides servo pump manipulations, if desired without driver feel. These units respond to signals from the electronic panel. A "fly-by-wire" throttle control or full electronic engine management can be accommodated by the system.

In order for the system to function correctly it is necessary to identify the existence of full clutch and part-throttle actuations, this will be achieved by the placement of switches (micro or proximity) at least at the full extends of the clutch and initial accelerator movements from the driver's foot pedals.

The transmission operator 34 includes an electro pneumatic ("EP") manifold is preferably broken down into two elements. The first associated with the front box and the second with back box operations. The EP manifold is a manifold controlled by solenoid valves and associated with the cylinders carrying the shift pistons.

The operator 34 also includes a shift unit with comprising air pistons moved by the servo operation of the appropriate EP valve as it is signaled from the electronic control box 38.

The driver could be instructed as follows: The vehicle will be stationary, air pressure at the right level, hand brake on, clutch disengaged and acceleration at idle. Neutral will be indicated in the display unit. The driver will move the gear lever forward once, thus pre-disposing the unit to start in the lowest ratio. No engagement has yet been made. The clutch pedal will be depressed and the micro switch becomes actuated at the extent of the travel.

With the engagement of first gear, the release of the clutch pedal and application of the throttle when the hand brake is released, the vehicle will move and normal acceleration follows. At the desired speed the driver may then select the next highest ratio by a single manipulation of the gear lever forwards. At zero speed one movement of the lever will return the gearbox to a starting gear from its status when the vehicle has come to rest.

The visual indication will be in such a position that the appropriate gear is shown without the need for the driver to divert fully his attention from the road ahead. The electronic panel, including CPU 38, receives the driver's commands from the gear selector unit, speed signals from the gearbox input and output shafts and will send commands to the EP manifold, shift unit, up shift inertia brake, engine and clutch control such that semi-automatic shifting is accomplished.

Control of the engine occurs in two (2) elements. The electronics will examine the condition between the transmission input and output shaft speeds and if an upshift is possible, an automatic firing of the throttle, clutch and upshift brake controls will take place giving synchronization and an engagement of second gear. Following the engagement of second, the upshift brake will be released (prior release may be initiated if required), and the clutch and engine controls restored to the status quo. The sequence, because it is automatic, will be so rapid that a minimum of loss of vehicle performance will be noticed and it will be almost impossible for the vehicle to move from a state of go to a state of no go. As could happen if the throttle manipulation was slaved to the whim of the driver. This sequence may be repeated up through the box as conditions allow until the highest ratio is reached.

Down shifts are required as the engine and vehicle speed decrease under adverse load/road conditions and a down shift may be requested at any time. The fulfillment of the shift, however, can only be achieved if sufficient engine speed range is available to achieve synchronization. Assuming that the conditions pertaining are current, then one of two sequences will occur. The sequence utilized is dependent upon the change being a back box only shift or a compound shift involving both front and back box.

Split shift—auxiliary section only

With the signal for a single back box shift the gear in the back box will be selected and the "throttle dip" (fuel pump towards idle) sequence initiated for a time sufficient to break the torque line and allow disengagement. The clutch also will be disengaged and then re-engaged. The "throttle dip" sequence will be ended and a period of "throttle blip" (fuel pump towards full throttle) commences. At the detection of synchronous the splitter mechanism will activate engaging the lower gear, the "throttle blip" period will end and the throttle restored to the state demanded by the driver.

Compound shift—main and auxiliary section

For a compound (main and auxiliary section change) shift. The sequence is only marginally different. The sequence up to and including the first clutch disengagement remain the same, but then the following sequence ensues. Neutral is selected in the front box while the clutch is still disengaged for an appropriate time period. The clutch is then re-engaged, the "throttle dip" signal removed and the throttle blip activated. At the detection of synchronous, the throttle blip is ended and following an appropriate delay period, the front box engagement is made.

The above sequences are illustrated in the flow charts of FIGS. 5–8.

ELECTRONICS TO ACHIEVE THE ABOVE FLOW CHARTS

Figure 4:
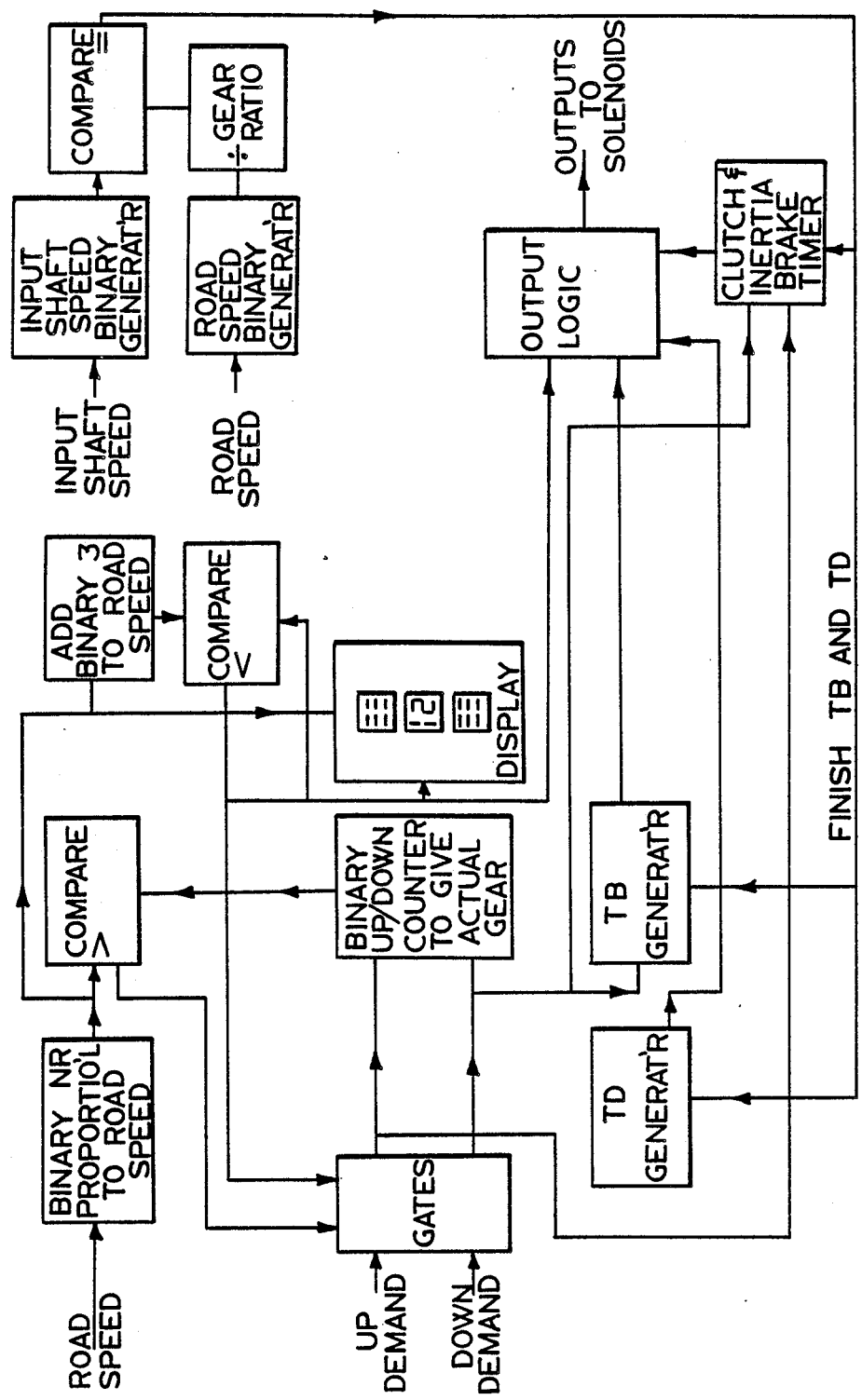
FIG. 4 shows in block schematic form, the logic and control electronics of the semi-automatic transmission control.
Figure 5:
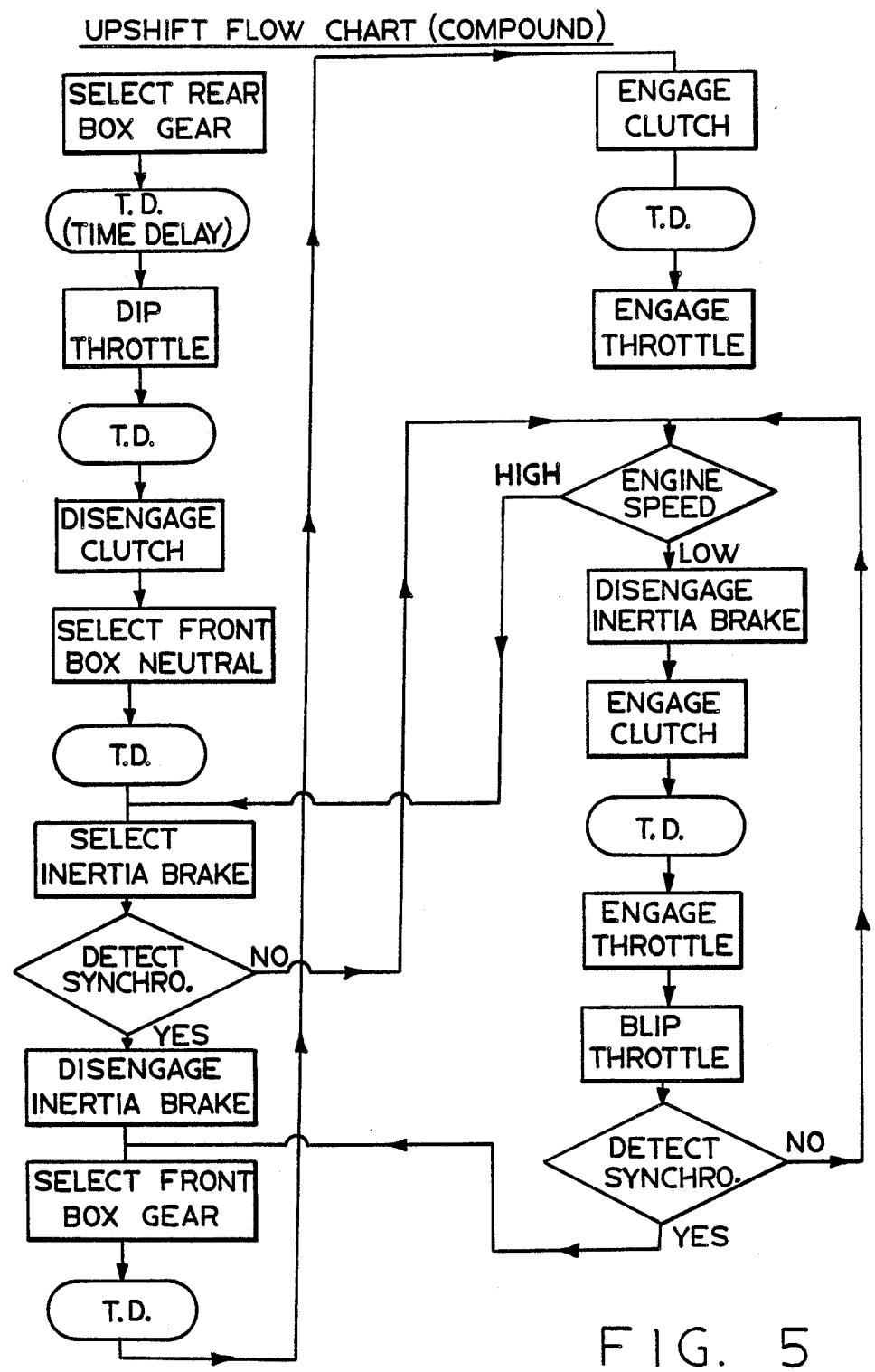
FIG. 5 illustrates the shift logic flow chart for a compound upshift.
Figure 6:
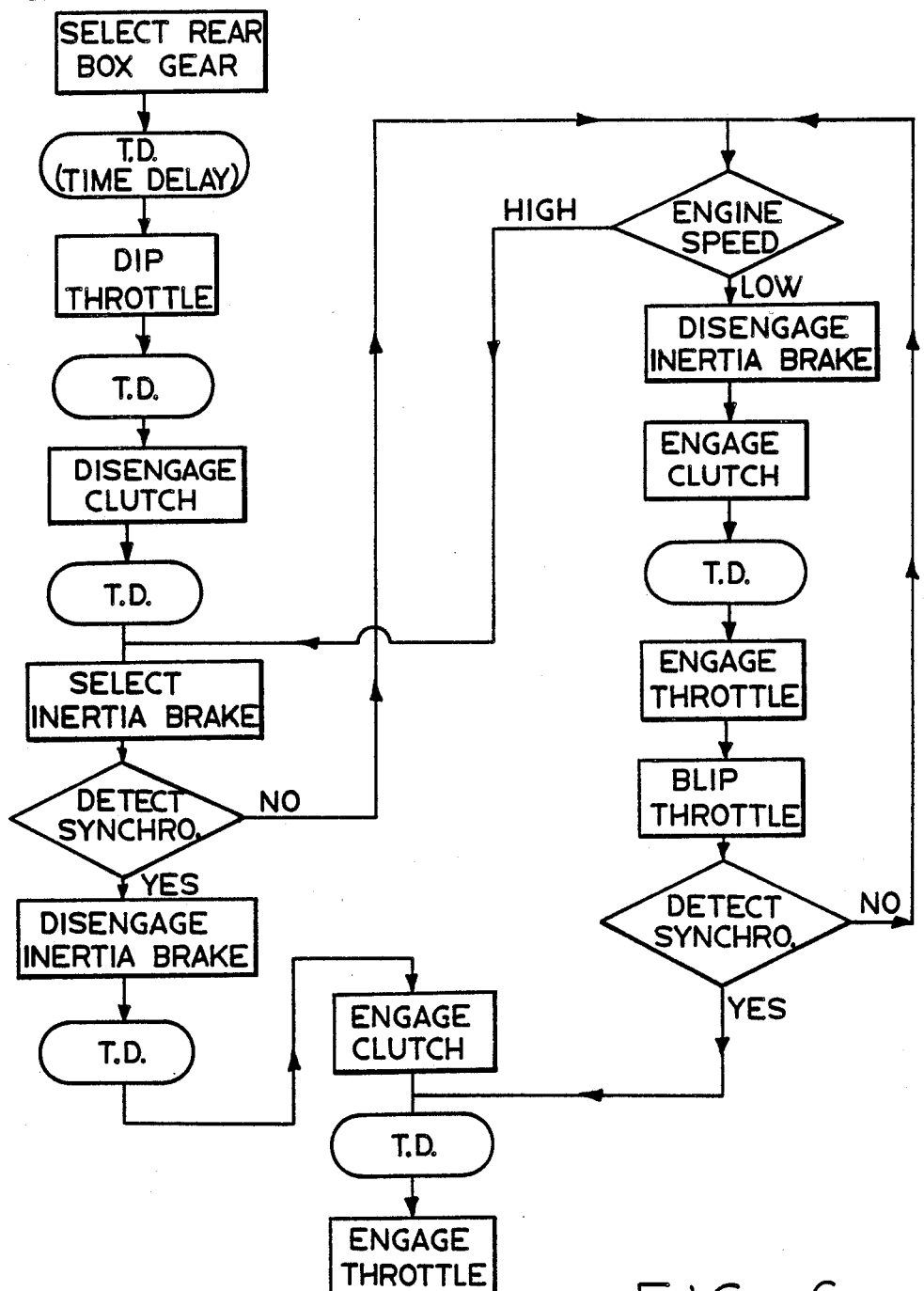
FIG. 6 illustrates the shift logic flow chart for a splitter shift only upshift.
Figure 7:
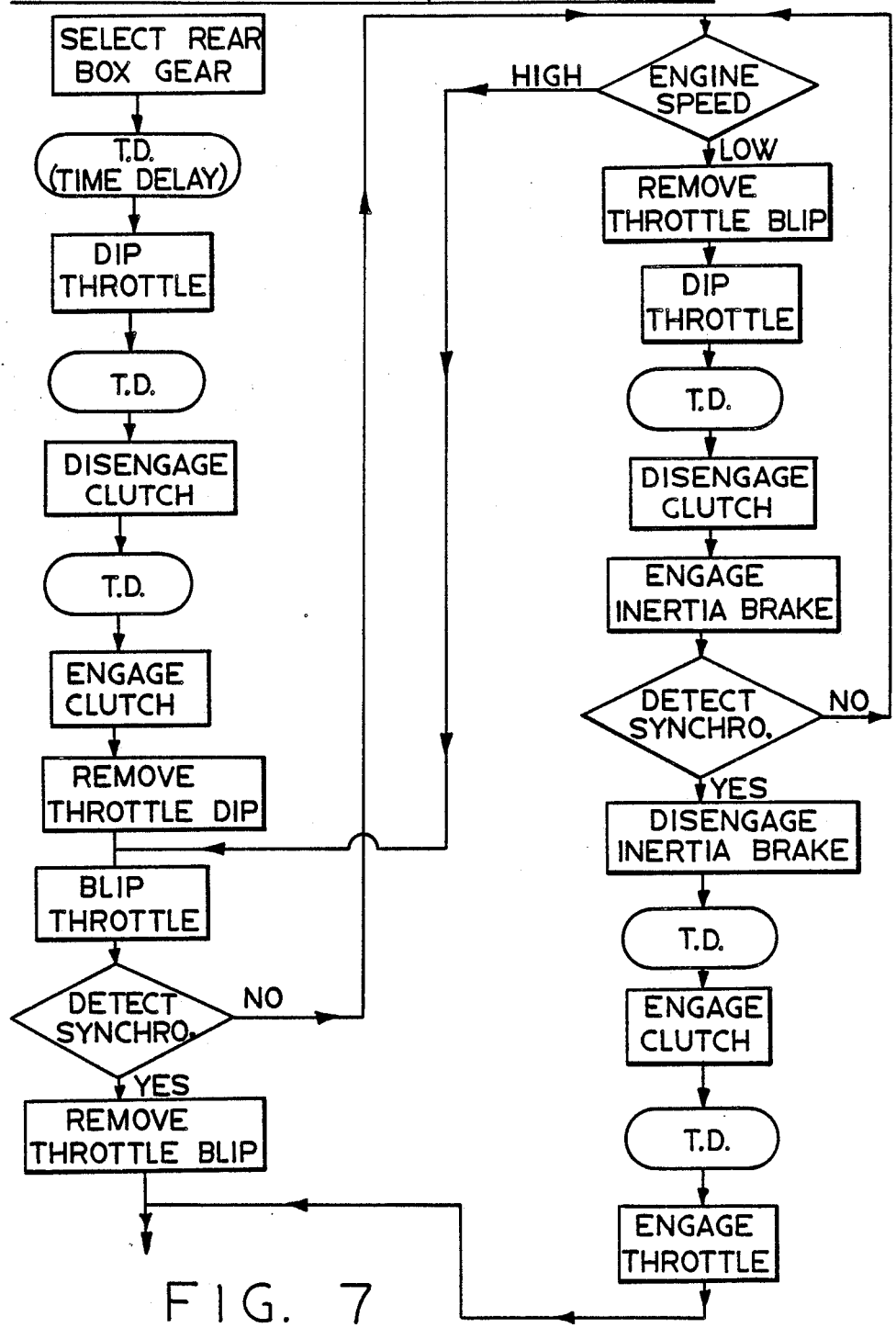
FIG. 7 illustrates the shift logic flow chart for a splitter shift only downshift.
Figure 8:
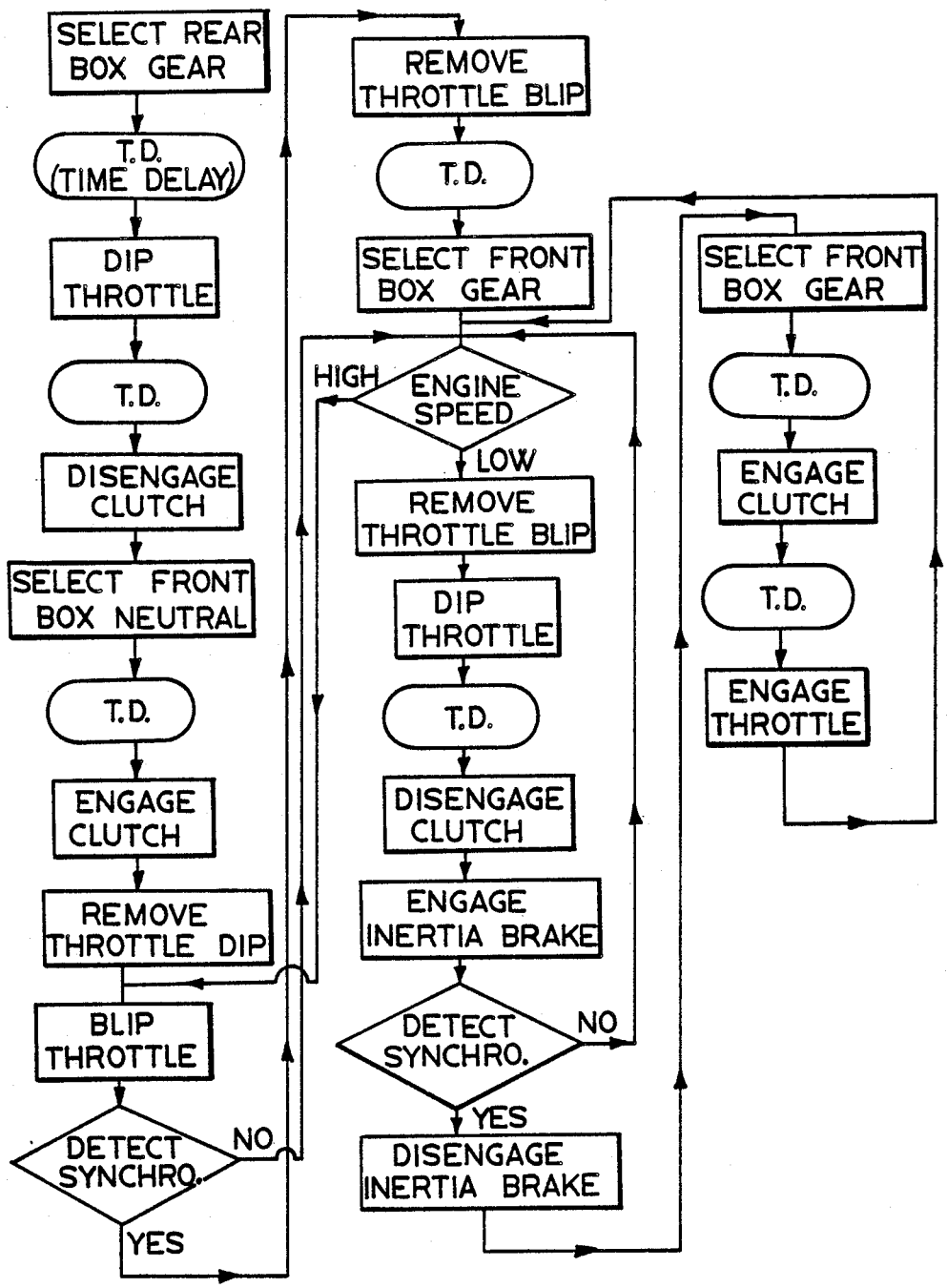
FIG. 8 illustrates the shift logic flow chart for a compound downshift.

Electronics are used to control the pneumatic control lines to the shift housing, engine speed, clutch and inertia brake operators. It also inhibits non-allowable gear changes and gives a display of present gear and gear(s) available for shifts. The inputs that the electronics respond to are gear lever demand signals, input shaft speed, output shaft speed throttle threshold position and clutch pedal position (whether depressed or not). The electronics are shown is in schematic block form in FIG. 4. The actual value road speed signals frequency is measured and respective set value binary numbers created that represent the maximum speeds available in all gears i.e. Binary 1 will occur at the maximum speed in first gear up to binary 11 which will occur at maximum speed available in eleventh gear.

This actual road speed binary number has a binary 3 added to it and both this added value and the actual speed binary are taken to two binary comparators, the other input of which comes from the present actual gear. The other input to each comparator has responded to the registered gear ratio engaged, to be supplied with the respective set value maximum speed binary. The effects of this is to create a "window" of available gears at any one actual road speed. Should the "demanded" gear be outside this window, then the selection is nullified by gates as will be described later. To take two examples, of this, at zero actual speed only gears 1, 2 and 3 will be available. At maximum actual speed in, say, second gear only gears 3, 4 and 5 will be available.

The "present" (or actual) gear selection binary comes from the outputs of a bidirectional 4 bit counter. An upshift demand causes the counter to increase and a downshift demand causes it to decrease. There are gates in the input which are closed if the "demanded" gear is outside the window. Should the required selection be outside the window because the speed is too low for the demanded down change, then the vehicle will change down further to the highest permissible gear.

Each upward shift will also initiate a Throttle Dip (TD) and each downward change will produce a Throttle Blip (TB). These will continue until the engine is synchronized with the road speed which will then cut off the respective TD or TB and select the next gear. See also the preceding flow charts.

Thus, it will be seen that the gear changes in the preferred embodiments do not depend on torque, although that could be built in. They are permitted in dependence only on the starting and finishing speeds, and on the actual gear engaged and the possible selected ratio.

It is emphasized that compared with a fully automatic transmission, the present semi-automatic transmission provides driver control and discretion, particularly advantageous at very low speeds and where the terrain or road conditions ahead may be difficult. He does not need to use the throttle and clutch to change ratios, except when starting from rest, or maneuvering. A cruise control or a governed top road speed could easily be incorporated in the control box 38. The driver feels negligible feedback on his foot when the throttle is being operated for shifts. The shifts are very rapid, so that the displayed condition of permissible shifts (e.g. skipping two ratios on an upshift) does not change during the brief time of the shift, the vehicle not appreciably slowing down. A normal synchromesh or nonsynchronized mechanical change gear gives no protection for the engine racing, or laboring at idle speeds after a misjudged but allowed and completed change.

Figure 9:
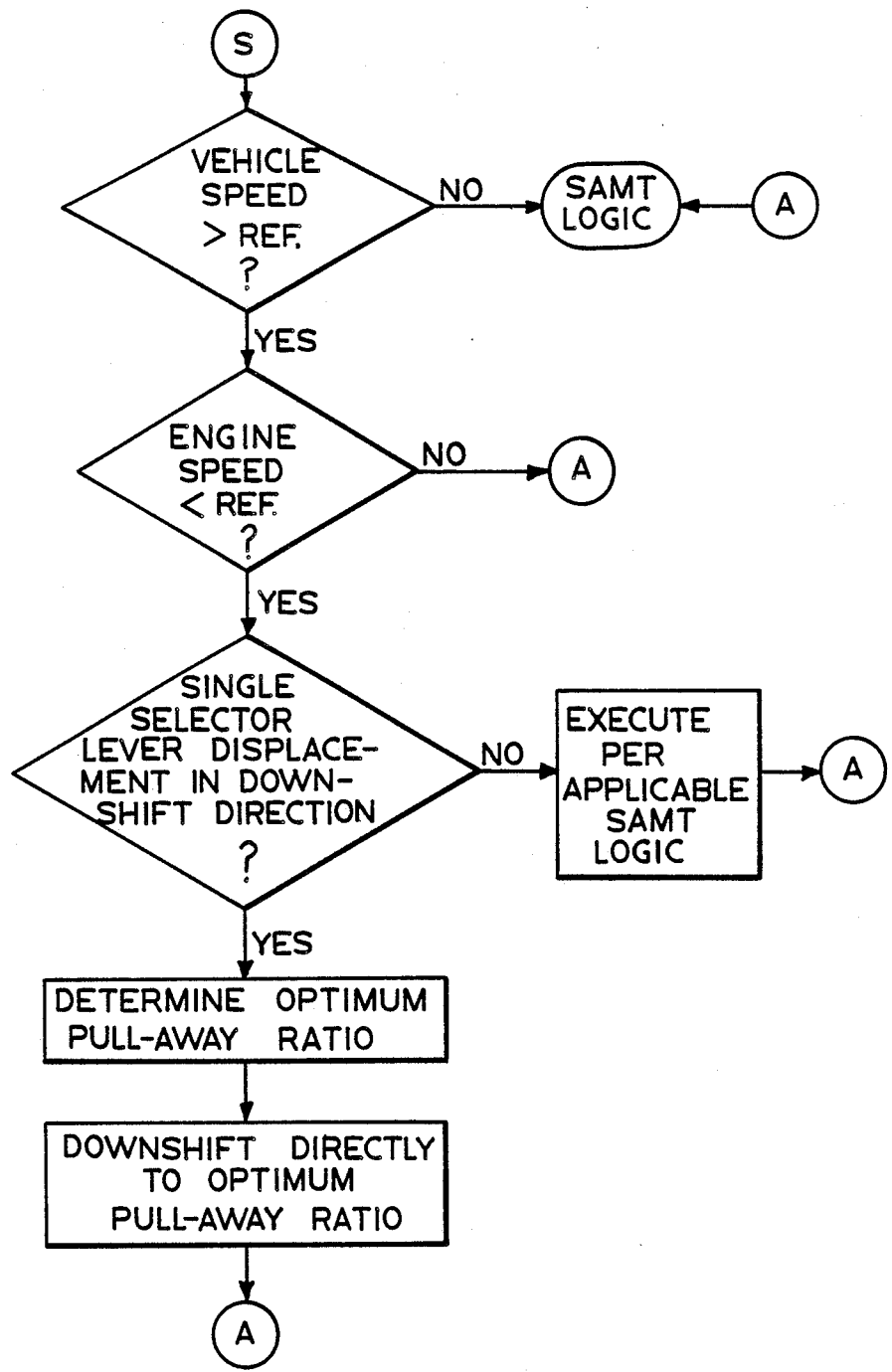
FIG. 9 is a schematic illustration, in the form of a flow chart, of the control method of the present invention.

As an additional feature, as illustrated in FIG. 9, if the operator allows the vehicle engine speed to fall below a reference value (such as the minimum engine speed providing acceptable torque level, such as below 800-1200 RPM for a typical heavy duty vehicle diesel engine) while the vehicle is in motion; as might occur in a congested traffic situation, or upon approaching a traffic circle or upon a hill; a single movement or pulse of lever 1 in the downshift direction will be interpreted as a request for automatic selection and engagement of an optimum pull-away ratio.

Briefly, an optimum pull-away ratio is that ratio which, at expected vehicle speed after completion of the downshift and reengagement of the master clutch (as a practical matter, this is generally equal to current vehicle speed) will result in an engine speed approximately midway between the maximum permitted (usually the governed) engine speed (usually governed at about 2100 RPM) and the peak torque speed of the engine. For a typical diesel engine, the target engine speed is about 1700-1800 RPM.

By the above procedure, the vehicle operator can, with relative ease, request automatic selection and engagement of a transmission ratio providing relative smooth vehicle operation and good vehicle performance for pulling away from a temporary traffic slowdown.

Although the preferred embodiment of the present invention has been described with a certain degree of particularity, various changes to form and detail may be made without departing from the spirit and scope of the invention as hereinafter claimed.

We claim:

1. A method of controlling a semi-automatic mechanical change gear transmission system (10) comprising a manual fuel throttle control (24), a fuel throttle controlled engine (14), a multi-speed change gear mechanical transmission (12), a friction master clutch (16) interposed the engine and transmission, a manually operated shift selection lever (1) moveable in a first direction from a centered position to select upshifts and in a second direction from said centered position to select downshifts from the currently engaged gear ratio, a central processing unit (38) for receiving inputs indicative of transmission input shaft and output shaft rotational speeds, of vehicle speed, of engine speed, of currently engaged ration and of operation of said shift selection lever and for processing same according to predetermined logic rules to issue command output signals to non-manually controlled operators including a clutch operator (30), a fuel throttle control operator (26), and a transmission operator (34), said processing unit sensing operation of said manual shift selection lever including the direction of movement thereof and a number of displacements of said lever within a predetermined period of time from said centered position, said method comprising the steps of: determining in a first mode of operation a transmission gear ratio selected by the operator to be shifted directly into from the currently engaged ratio by assuming each repetition of displacement from the centered position of said shift selection lever in a given direction indicates operator selection of a change of one additional consecutive ratio in said direction, and selecting automatically in a second mode of operation interpretation of a single displacement of said shift selection lever from the centered position in the second direction as an operator selection of a downshift directly into an optimum pull-away transmission ratio if vehicle speed is greater than a predetermined vehicle speed reference value and engine speed is less than a predetermined engine speed reference value.

2. The method of claim 1, wherein said optimum pull-away ratio is the transmission ratio which, at expected vehicle speed after completion of a shift, will result in said engine rotating at an engine speed approximately midway between a predetermined maximum allowable engine speed and a peak torque speed of the engine.

3. The method of claim 2, wherein said engine is a diesel engine having a maximum governed speed, said predetermined maximum allowable speed equaling said maximum governed speed.

4. The method of claim 2, wherein said predetermined engine speed reference value corresponds to the engine speed below which engine torque less than a minimum acceptable value.

5. The method of claim 4, wherein said minimum acceptable torque value is about thirty percent of peak engine torque.

6. The method of claim 3, wherein said predetermined engine speed reference value corresponds to the engine speed below which engine torque less than a minimum acceptable value.

7. The method of claim 6, wherein said minimum acceptable torque value is about thirty percent of peak engine torque.

8. The method of claim 2, wherein said engine is a diesel engine having a maximum governed speed of about 2100 RPM, said engine speed reference value is about 1000 RPM and said engine speed midway between maximum allowable speed and peak torque speed is about 1750 RPM.

9. The method of claim 3, wherein said engine is a diesel engine having a maximum governed speed of about 2100 RPM, said engine speed reference value is about 1000 RPM and said engine speed midway between maximum allowable speed and peak torque speed is about 1750 RPM.

10. The method of claim 2 wherein, in said first mode of operation, said processing unit is effect to process said input signals to determine the currently engaged gear ratio of said transmission and to determine permissibly engaged gear ratios of said transmission under sensed vehicle operating conditions and to issue command output signals to cause an automatic upshift or downshift from the currently engaged gear ratio to the least displaced gear ratio from currently engaged gear ratio of (1) the operator selected gear ratio or (2) the most displaced from currently engaged ratio of the permissible gear ratios in the selected direction of shifting, said command output signals causing said transmission to be shifted directly from said currently engaged gear ratio to said least displaced gear ratio.

11. The method of claim 4 wherein, in said first mode of operation, said processing unit is effect to process said input signals to determine the currently engaged gear ratio of said transmission and to determine permissibly engaged gear ratios of said transmission under sensed vehicle operating conditions and to issue command output signals to cause an automatic upshift or downshift from the currently engaged gear ratio to the least displaced gear ratio from currently engaged gear ratio of (1) the operator selected gear ratio or (2) the most displaced from currently engaged ratio of the permissible gear ratios in the selected direction of shifting, said command output signals causing said transmission to be shifted directly from said currently engaged gear ratio to said least displaced gear ratio.

12. The method of claim 5 wherein, in said first mode of operation, said processing unit is effect to process said input signals to determine the currently engaged gear ratio of said transmission and to determine permissibly engaged gear ratios of said transmission under sensed vehicle operating conditions and to issue command output signals to cause an automatic upshift or downshift from the currently engaged gear ratio to the least displaced gear ratio from currently engaged gear ratio of (1) the operator selected gear ratio or (2) the most displaced from currently engaged ratio of the permissible gear ratios in the selected direction of shifting, said command output signals causing said transmission to be shifted directly from said currently engaged gear ratio to said least displaced gear ratio.

13. A control for a semi-automatic mechanical change gear transmission system (10) comprising a manual fuel throttle control (24), a fuel throttle controlled engine (14), a multi-speed change gear mechanical transmission (12), a friction master clutch (16) interposed the engine and transmission, a manually operated shift selection lever (1) moveable in a first direction from a centered position to select upshifts and in a second direction from said centered position to select downshifts from the currently engaged gear ratio, a central processing unit (38) for receiving inputs indicative of transmission input shaft and output shaft rotational speeds, of vehicle speed, of engine speed and of operation of said shift selection lever and for processing same according to predetermined logic rules to determined currently engaged gear ratio and to issue command output signals to non-manually controlled operators including a clutch operator (30), a fuel throttle control operator (26), and a transmission operator (34), logic rules causing said processing unit in a first mode of operation, to determine the transmission gear ratio selected by the operator to be shifted into from the currently engaged ratio by assuming each displacement from the centered position of said shift selection lever in a given direction indicates operator selection of a change in ratio in said direction and in a second mode of operation causing said processing unit to interpret a single displacement of said shift selection lever from the centered position in the second direction as an operator selection of a downshift directly into an optimum pullaway ratio if vehicle speed is greater than a predetermined vehicle speed reference value and engine speed is less than a predetermined engine speed reference value.

14. The control of claim 13, wherein said optimum pull-away ration is a transmission ratio which, at expected vehicle speed after completion of a shift, will result in said engine rotating at an engine speed approximately midway between a predetermined maximum allowable engine speed and a peak torque speed of the engine.

15. The control of claim 14, wherein said engine is a diesel engine having a maximum governed speed, said predetermined maximum allowable speed equaling said maximum governed speed.

16. The control of claim 14, wherein said predetermined engine speed reference value corresponds to the engine speed below which engine torque less than a minimum acceptable value.

17. The control of claim 16, wherein said minimum acceptable torque value is about thirty percent of peak engine torque.

18. The control of claim 14, wherein said engine is a diesel engine having a maximum governed speed of about 2100 RPM, said engine speed reference value is about 1000 RPM and said engine speed midway between maximum allowable speed and peak torque speed is about 1750 RPM.

* * * * *